J. U. McDONALD.
PROCESS FOR MAKING GAS.
APPLICATION FILED MAR. 2, 1921.
Reissued Mar. 28, 1922.
15,320.
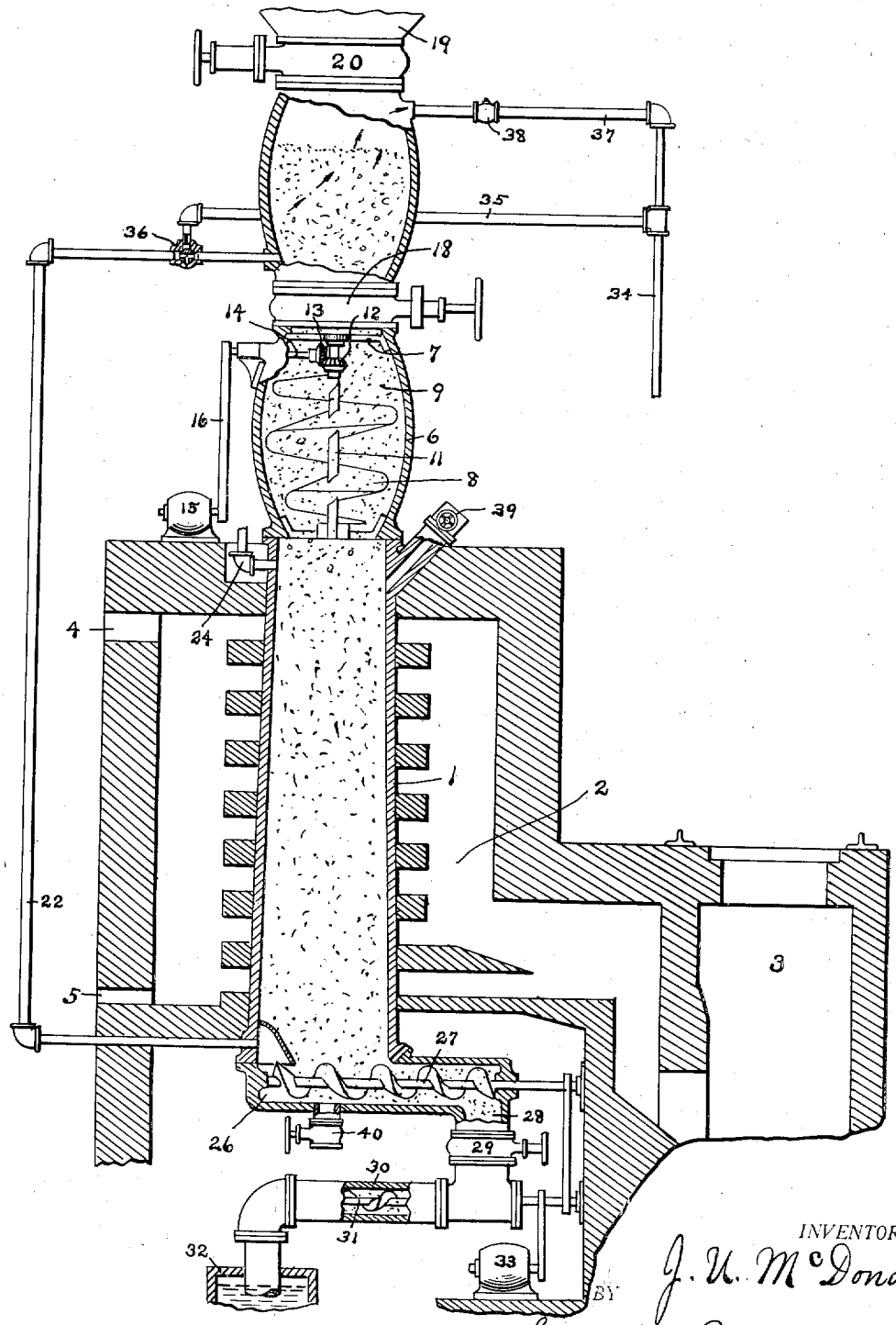
INVENTOR.
J. U. McDonald
BY
Edward N. Pagelsen.
ATTORNEY.

UNITED STATES PATENT OFFICE.

JOHN URBAN McDONALD, OF DECATUR, ILLINOIS.

PROCESS FOR MAKING GAS.

15,320. Specification of Reissued Letters Patent. Reissued Mar. 28, 1922.

Original No. 1,367,321, dated February 1, 1921, Serial No. 364,651, filed March 10, 1920. Application for reissue filed March 2, 1921. Serial No. 449,224.

*To all whom it may concern:*

Be it known that I, JOHN URBAN McDONALD, a citizen of the United States, and residing at Decatur, in the county of Macon and State of Illinois, have invented a new and Improved Process for Making Gas, of which the following is a specification.

My invention relates to the manufacture of gas for heating, illuminating and power purposes by the destructive distillation of carbonaceous matter, especially coal, peat, saw-mill refuse, wood, garbage and other organic material in general.

The object of this invention is the production of permanent gases from wet carbonaceous material at minimum cost without the use of the expensive mineral oils now usually employed.

A further object of this invention is the conversion of all of the gas producing constituents of the carbonaceous material including the tar, and the moisture content, into gas, so as to thereby obtain a maximum revenue from the material acted upon.

This invention consists in heating the wet gas producing material in a retort which is so constructed that the steam and gases produced by such heating cannot escape from above the heated zone but are forced down by their own pressure through the heated zone where chemical action causes the gas producing material to become intensely hot and thereby also causes an increased production of gases which are carried away from below the incandescent material.

The invention further consists in conveying the gas from below the highly heated gas-forming material through fresh amounts of such material so that the heat of the gas will be conserved by communicating it to the fresh gas-forming material.

The accompanying drawing represents a diagrammatic section of a device which may be employed to carry this process into effect.

The retort 1 may be of any desired cross section but is preferably cylindrical and is mounted in a heating chamber 2 so that it may be highly heated, particularly intermediate its ends. The heating chamber connects to a furnace 3 and may be provided with a flue 4 and an auxiliary air passage 5. Any other desired type of heating device may be employed.

Above the retort is mounted a feeding chamber 6 provided with spiders 7 to support the helical conveyer 8 by means of which the wet gas producing material 9 is fed down into the retort, should such material fail to be moved by gravity, the rate of such feeding depending upon the character of the material, the heat that is maintained in the retort, and the rate of reduction of the material to gas. The conveyer is shown mounted on a shaft 11 having a bevel gear 12 near one end, which gear meshes with the bevel gear 13 on the shaft 14 that is driven by a motor 15 by means of a belt 16.

Above the feeding chamber is a charge chamber 17, and between the two chambers is a valve 18. Above the charge chamber is shown a hopper 19 of any desired construction, while a valve 20 is placed between it and the charge chamber. The carbonaceous material is permitted to fall into the charge chamber 17 in batches, after which the valve 20 is closed and the valve 18 opened to permit the batch to fill the feeding chamber from which the material passes to the retort at a constant rate. After the desired amount has fallen into the feeding chamber the valve 18 is closed to prevent the escape of gases from the feeding chamber.

The retort is heated to such a temperature that a portion of the carbonaceous material becomes incandescent and the volatile portions thereof are driven off. At the same time, the moisture in this material becomes superheated steam, a pressure of mixed gas and steam accumulating in the upper part of the retort and resulting in gas and steam being forced down through the hot carbonaceous material.

The steam in passing through the bed of incandescent carbon becomes dissociated, the oxygen combines with the carbon to produce carbon monoxide and dioxide, the hydrogen upon being liberated mixes with the mass of combined gases, a fractional portion uniting with carbon to form marsh gas ($CH_4$). All of the gas producing material is therefore changed to gas. The gases thus produced collect below the incandescent zone and pass out through the pipe 22. If the amount of moisture in the carbonaceous matter is below the maximum that can be properly split up in the retort, a proper amount of superheated steam may be added through the pipe 24 which connects to any proper source of supply.

The waste passes to the bottom of the retort into a trough 26, from which it is removed in any desired manner. In the drawing, a screw conveyer 27 is shown which carries the waste to a passage 28 controlled by a valve 29. This passage opens into a chamber 30 containing a screw conveyer 31 which discharges the waste into a receptacle 32. The two conveyers may be driven by a motor 33.

The gas from the pipe 22 may be passed through the charge in the chamber 17 where it gives off its heat to the fresh material therein, and then passes to the pipe 34 through the pipe 37. The three-way valve 36 connects into the pipe 22 and to the pipe 35 so that the gas may pass directly to the pipe 34 without passing through the chamber 17. A check valve 38 prevents a return flow of the gas into the chamber 17.

The temperature of the heater may be controlled in any desired manner. The contents of the retort may be stirred up through the valve controlled openings 39 and 40. The principal departure of this process from the prior art lies in the production of gases and very hot steam above a zone or bed of incandescent carbon in a chamber of such construction that the gases and steam are forced by their own pressure through this intensely hot zone, resulting in the production of a maximum amount of heating and power gases.

I claim:—

1. The process of making gas consisting in introducing wet garbage into the top of a vertical retort, heating an intermediate zone of the retort sufficiently to render the fixed carbon of the garbage incandescent at that point, thereby heating the garbage above the incandescent zone sufficiently to vaporize the moisture and gasify the volatile matter of the garbage, the resultant gases, tar vapor and steam being forced down by their own pressure through the incandescent layer causing all the incandescent carbon to oxidize to form fixed gases which pass down with the gases of the volatile matter through the ashes in the bottom of the retort, thereby causing the total gasification of the combustible constituents of the garbage.

2. The process of making gas consisting in introducing carbonaceous gas making material into a retort, heating an intermediate zone of the retort sufficiently to render the fixed carbon of the carbonaceous material incandescent at that point, thereby heating the carbonaceous material at one side of the incandescent zone sufficiently to vaporize the moisture and gasify the volatile matter of the carbonaceous material, the resultant gases, tar vapor and steam being forced by their own pressure through the incandescent layer causing all the incandescent carbon to oxidize to form fixed gases which pass with the gases of the volatile matter through the ashes in the retort, thereby causing the total gasification of the combustible constituents of the carbonaceous material, superheated steam being admitted to supply oxygen and hydrogen to cause this complete gasification of the incandescent carbon.

3. The process of making gas consisting in introducing carbonaceous gas making material at a substantially constant rate into the top of a closed vertical retort without interrupting the operation of said retort, heating an intermediate zone of the retort sufficiently to render the fixed carbon of the carbonaceous material incandescent at that point, thereby heating the carbonaceous material above the incandescent zone sufficiently to vaporize the moisture and gasify the volatile matter of the carbonaceous material, the resultant gases, tar vapor and steam being forced down by their own pressure through the incandescent layer causing all the incandescent carbon to combine with hydrogen and oxygen to form fixed gases which pass down with the gases of the volatile matter through the ashes in the bottom of the retort, thereby causing the total gasification of the combustible constituents of the carbonaceous material, superheated steam being admitted to supply oxygen to cause this complete gasification of the incandescent carbon.

4. The process of making gas consisting in introducing carbonaceous gas making material at a substantially constant rate into the top of a closed vertical retort without interrupting the operation of the retort, heating an intermediate zone of the retort sufficiently to render the fixed carbon of the carbonaceous material incandescent at that point, thereby heating the carbonaceous material above the incandescent zone sufficient to gasify the volatile matter of the carbonaceous material, the resultant gases, tar vapor and steam being forced down by their own pressure through the incandescent layer causing the incandescent carbon to oxidize to form fixed gases which pass down with the gases of the volatile matter, and permitting the escape of the gas from the retort below said zone.

JOHN URBAN McDONALD.